United States Patent [19]
Takeyama et al.

[11] 3,942,229
[45] Mar. 9, 1976

[54] CUTTING TOOL FOR CONTROLLING CHIP DISPOSAL

[75] Inventors: Hidehiko Takeyama, Tokyo; Tsutomu Yato, Komae, both of Japan

[73] Assignee: Agency of Industrial Science & Technology, Tokyo, Japan

[22] Filed: Apr. 1, 1974

[21] Appl. No.: 456,440

[30] Foreign Application Priority Data
June 5, 1973   Japan.................................. 48-63142

[52] U.S. Cl................................................ 29/95 R
[51] Int. Cl.²............................................. B26D 1/00
[58] Field of Search............................... 29/95 R, 96

[56] References Cited
UNITED STATES PATENTS

| | | | |
|---|---|---|---|
| 3,052,951 | 9/1962 | Kubota................................ | 29/95 R |
| 3,142,110 | 7/1964 | Hertel.................................. | 29/95 R |
| 3,751,782 | 8/1973 | Fruish.................................. | 29/95 R |

*Primary Examiner*—Leonidas Vlachos
*Attorney, Agent, or Firm*—Oblon, Fisher, Spivak, McClelland & Maier

[57] ABSTRACT

The discharging direction of chip is controlled arbitrarily and the curling configuration of the chip is also regulated by providing a three-dimensional angulation on a rake of a cutting tool and forming the angulation at a specific angle with respect to the rake.

2 Claims, 10 Drawing Figures

Fig. 1
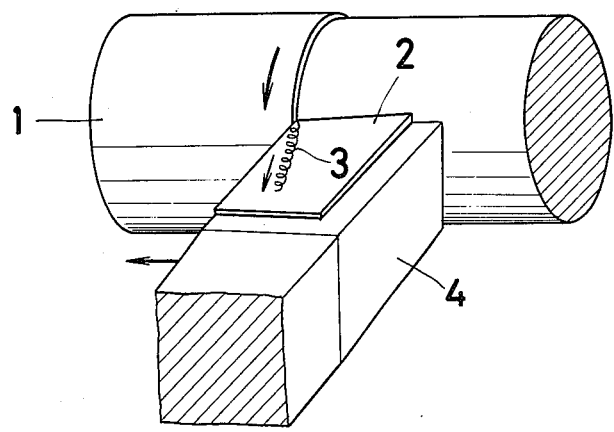
Fig. 2
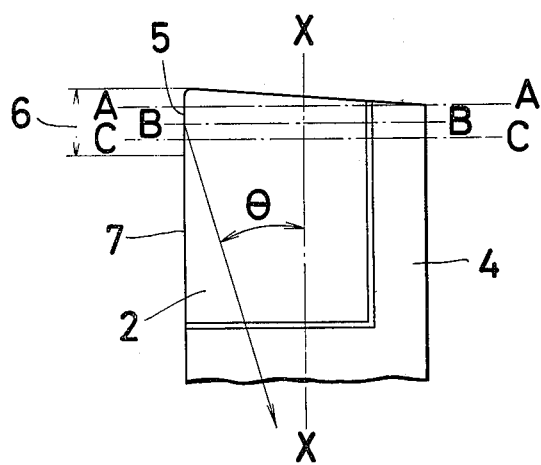
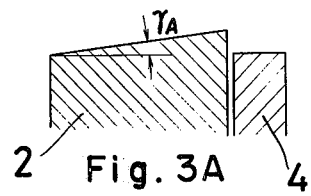
Fig. 3A
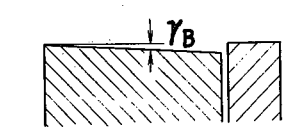
Fig. 3B
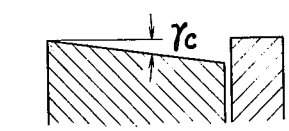
Fig. 3C

CUTTING TOOL FOR CONTROLLING CHIP DISPOSAL

BACKGROUND OF THE INVENTION

The present invention relates to a cutting tool for controlling chip disposal.

The control and disposal of chip produced at high speed during machining is a major problem not only from the aspect of safety, but also because such chip hampers production by adversely affecting the efficiency of the machine and tool used, and consequently affecting the workpiece. In order to resolve this problem, various means have been proposed. For example, a means in which a nozzle is provided adjacent to a cutting portion to blow away chip produced from the cutting portion in a set direction by air supplied through the nozzle under pressure and another means in which a chip forming groove is provided on a rake of the cutting tool such as to curl the chip into a coil and discharge it in a set direction, etc. have been known. The latter means, however, is ineffective unless the feeding rate of the tool is at or higher than 0.1 mm/revolution.

Irrespective of these prior means for controlling chip disposal, there has been no conclusive means and, in particular, there has been no substantially reliable means applicable for finishing or facing at a small cutting depth and a low feeding rate.

An object of the present invention is to provide a cutting tool with which chip produced during the cutting process is curled to form a readily treatable state and to discharge such chip in a desired direction to thereby make the handling thereof easy.

SUMMARY OF THE INVENTION

In order to achieve the above-mentioned object of the present invention, the cutting tool according to the present invention is provided with a continuous or stepped three-dimensional angulation on a rake thereof. By providing a certain angulation on the rake, it becomes possible, even with a small cutting depth and at a low feeding rate, to curl the chip produced during the cutting process and discharge the resulting coil in any desired direction, and to thereby make possible easy and effective handling and disposal of chip.

BRIEF DESCRIPTION OF THE DRAWING

FIG. 1 is a perspective view of a workpiece and a cutting tool having a tip constructed according to the present invention with the both being in the cutting condition;

FIG. 2 is a plan view of an embodiment of the cutting tool according to the present invention;

FIGS. 3A, 3B and 3C are cross-sections taken along lines A—A, B—B and C—C respectively of FIG. 2;

DETAILED EXPLANATION OF THE INVENTION

Figure 4:
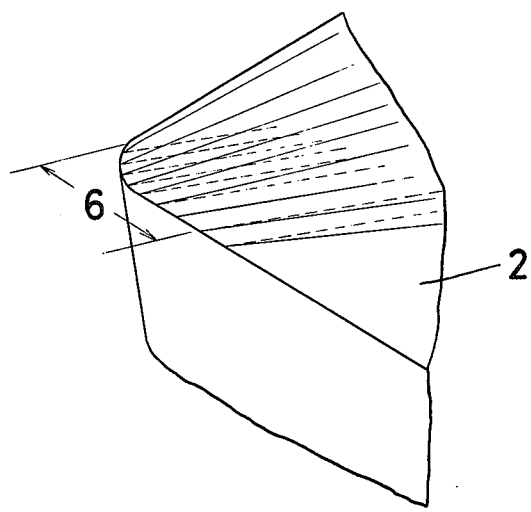
FIG. 4 is an enlarged perspective view of a top portion of the cutting edge of the tool shown in FIG. 2.

Referring to FIG. 1, it is assumed that a workpiece 1 is cut by a cutting tool 2 as shown. With the prior art, a chip 3 will be randomly scrambled and entangled on a rake of the tool, resulting in scratches on the workpiece, necessitating therefore, stopping the cutting process in order to remove the entangled chip from the tool.

The cutting tool 2 of the present invention is provided, on the rake angle thereof, with an angulation. The angulation is provided on essentially only an active cutting edge 6 of the tool 1, which serves to actually cut the workpiece, as shown in FIG. 2, and it is unimportant to consider the rake angle of the remaining edge portion thereof. As shown in FIGS. 3A, 3B and 3C, the angulation formed is such that, taking the height of the top portion of the tool as reference, a minus rake angle $\gamma_A$, a small plus rake angle $\gamma_B$ and a plus rake angle $\gamma_C$ are formed on the rake along the lines A—A, B—B and C—C, respectively.

FIG. 4 shows an embodiment of the present cutting tool which has a rake formed with a continuously changing rake angle according to the above-mentioned angle distribution with reference to FIGS. 3A, 3B and 3C. In FIG. 4, the solid lines show the rake and the dotted lines show the height of the horizintal reference planes.

When a workpiece is cut with the cutting tool provided with the angulation on the active cutting edge portion 6 thereof, the chip is discharged in a direction along which the energy of the chip is minimized, that is, a direction along which the rake angle is plus. The configuration of the chip discharged as a result of this angulationn becomes a tightly coiled one due to sharp change in the chip-thickness ratio (chip thickness/uncut chip thickness).

The change of side rake angle in the shank direction of the tool is selected in the order of 15° in the case of a minus angle and in the order of 10° in the case of a plus angle, and when in either case the angle is made greater, the discharging direction of the chip will be shifted toward a side cutting edge 7.

As an example, a cutting operation was performed on a S15C circular steel rod workpiece with a cutting tool having the change of side rake angle of −10° in the shank direction under the conditions of 0.5 mm cutting depth, 0.05 mm/min. feeding rate and 80 m/min. cutting velocity. The chip wass discharged in a direction at an angle of between 6° and 10° with respect to the side cutting edge.

In this manner, by providing an angulation on the rake of the cutting tool and by setting the angle suitably, the discharging direction of the chip can be arbitrarily controlled and concurrently the configuration of the chip can also be regulated.

Figure 5:
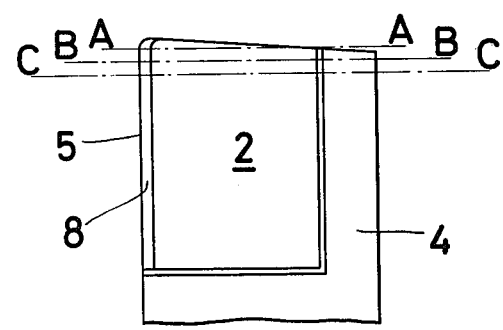
FIG. 5 is a plan view of another embodiment of the present invention.

FIGS. 5 and 6 show another embodiment of the present cutting tool in which a land is provided on the active cutting edge thereof. By providing a land having a suitable angle and width on the cutting edge, it is possible to improve the coiling effect of the cutting shoulder thereby making the configuration of the chip such that the handling thereof becomes more easy and thereby enables arbitrary control of the discharging direction thereof.

Figure 6A:
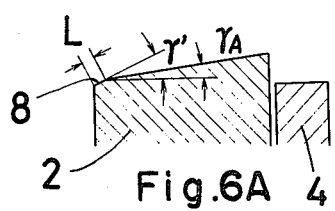
FIGS. 6A, 6B and 6C are cross-sections taken along lines A—A, B—B and C—C in FIG. 5, respectively.
Figure 6B:
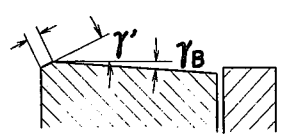
Figure 6C:
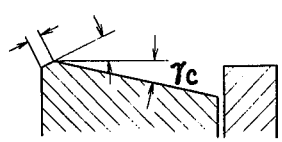

Returning to FIG. 5, a land 8 is provided on the side cutting edge of the active cutting edge 5 of the tool 2. FIGS. 6A, 6B and 6C show the cross-sections of the top portion of the tool 2 taken along lines A—A, B—B and C—C in FIG. 2, in which the active cutting edge is provided with the land 8 having a rake angle of normally from 0° to a certain minus value and with the continuous or stepped changing rank angles $\gamma_A$, $\gamma_B$ and $\gamma_C$. With this arrangement, it is easily possible to select the curling configuration and the discharging direction etc. of the chip, so that the handling thereof becomes easy.

As described herein before, according to the present cutting tool having an angulation on the rake thereof, it is possible to provide a suitable configuration thereto to make it easy to handle and to control the discharging direction thereof arbitrarily, even when the cutting depth is very small and the feeding rate very low during operation, and due to this fact, it is possible to expect improvements in safety and in production.

As to the fabrication of the conventional cutting tool, a high level of manufacturing technique has been required to provide a rake angle on the tool. Although, in forming the present cutting tool, the same grinding process may be utilized with a specially designed tool grinder, it may be possible to manufacture the present tool by using a sintering mold method with a preformed mold.

What is claimed is:

1. A cutting tool for controlling chip disposal, comprising:
    a rake surface which defines a side rake angle with respect to a horizontal plane of said tool,
    said side rake angle being continuously varied with respect to said horizontal plane of said tool and in the shank direction of said tool throughout a range of $-15°-+10°$.

2. A cutting tool as set forth in claim 1, further comprising:
    a land provided upon the side cutting edge of said tool.

* * * * *